(12) United States Patent
Gu

(10) Patent No.: US 12,289,339 B2
(45) Date of Patent: Apr. 29, 2025

(54) DOMAIN NAME IDENTIFICATION

(71) Applicant: NEW H3C SECURITY TECHNOLOGIES CO., LTD., Hefei (CN)

(72) Inventor: Chengjie Gu, Beijing (CN)

(73) Assignee: NEW H3C SECURITY TECHNOLOGIES CO., LTD., Hefei (CN)

( * ) Notice: Subject to any disclaimer, the term of this patent is extended or adjusted under 35 U.S.C. 154(b) by 913 days.

(21) Appl. No.: 17/050,026

(22) PCT Filed: May 15, 2019

(86) PCT No.: PCT/CN2019/087076
§ 371 (c)(1),
(2) Date: Oct. 23, 2020

(87) PCT Pub. No.: WO2019/223587
PCT Pub. Date: Nov. 28, 2019

(65) Prior Publication Data
US 2021/0097399 A1    Apr. 1, 2021

(30) Foreign Application Priority Data

May 21, 2018    (CN) .......................... 201810489709.0

(51) Int. Cl.
*H04L 9/40* (2022.01)
*G06F 18/213* (2023.01)
(Continued)

(52) U.S. Cl.
CPC ........ *H04L 63/1441* (2013.01); *G06F 18/213* (2023.01); *G06N 3/04* (2013.01); *G06N 3/084* (2013.01); *H04L 61/4511* (2022.05)

(58) Field of Classification Search
None
See application file for complete search history.

(56) References Cited

U.S. PATENT DOCUMENTS 9,653,093 B1 *   5/2017   Matsoukas .............. G10L 15/16
10,257,153 B2 *  4/2019   Sano .................... H04L 61/4511
(Continued)

FOREIGN PATENT DOCUMENTS

CN    101702660    5/2010
CN    103428307    12/2013
(Continued)

OTHER PUBLICATIONS

Artificial neural networks in hardware: A survey of two decades of progress Author: Misra et. al. https://www.sciencedirect.com/science/article/pii/S092523121000216X (Year: 2010).*
(Continued)

*Primary Examiner* — Mandrita Brahmachari
(74) *Attorney, Agent, or Firm* — NORTON ROSE FULBRIGHT US LLP

(57) ABSTRACT

A domain name resolution request sent by a terminal is received. The domain name resolution request includes a domain name to be identified. The domain name includes at least one character. A sequence matrix corresponding to the domain name is determined. The sequence matrix includes at least one character vector. Each of the at least one character vector corresponds to each of the at least one character one to one. Each of the at least one character vector is sequentially input to an input and output gate. The input and output gate includes a logical operation rule between a plurality of activation functions. A feature vector corresponding to the sequence matrix is obtained by performing logical operation processing on each of the at least one character vector based on the logical operation rule between the plurality of activation functions.

10 Claims, 7 Drawing Sheets

(51) Int. Cl.
*G06N 3/04* (2023.01)
*G06N 3/084* (2023.01)
*H04L 61/4511* (2022.01)

(56) References Cited

U.S. PATENT DOCUMENTS

| | | | |
|---|---|---|---|
| 10,528,667 B2* | 1/2020 | Li | G06F 40/30 |
| 10,878,093 B2* | 12/2020 | Saxe | G06N 3/084 |
| 2003/0138147 A1* | 7/2003 | Ongkojoyo | G06F 18/00 382/224 |
| 2008/0216168 A1 | 9/2008 | Larson et al. | |
| 2008/0273680 A1* | 11/2008 | Zohar | H04Q 3/0016 379/201.01 |
| 2009/0043721 A1 | 2/2009 | Reznik et al. | |
| 2010/0299409 A1* | 11/2010 | Cartmell | H04L 61/3025 709/219 |
| 2015/0256424 A1* | 9/2015 | Kaliski, Jr. | H04L 61/10 709/224 |
| 2017/0372071 A1* | 12/2017 | Saxe | G06N 3/084 |
| 2018/0091479 A1 | 3/2018 | Yu et al. | |
| 2018/0097822 A1 | 4/2018 | Huang et al. | |
| 2018/0288086 A1* | 10/2018 | Amiri | G06N 3/08 |
| 2019/0228154 A1* | 7/2019 | Agrawal | G06N 3/047 |
| 2019/0349399 A1* | 11/2019 | Liu | H04L 63/1483 |

FOREIGN PATENT DOCUMENTS

| | | |
|---|---|---|
| CN | 105577660 | 5/2016 |
| CN | 105610830 | 5/2016 |
| CN | 105827594 | 8/2016 |
| CN | 106233296 | 12/2016 |
| CN | 106713312 | 5/2017 |
| CN | 107682348 | 2/2018 |
| CN | 107807987 | 3/2018 |
| JP | 4250618 B2 * | 4/2009 |

OTHER PUBLICATIONS

Differential Recurrent Neural Networks for Action Recognition Author: Veeriah et.al https://www.cv-foundation.org/openaccess/content_iccv_2015/html/Veeriah_Differential_Recurrent_Neural_ICCV_2015_paper.html (Year: 2015).*
Understanding LSTM (Year: 2015).*
KojiOhki [Christopher Olah]. "Understanding LSTM Networks." *qiita*, Aug. 27, 2017, https://gilta.com/KoliOhki/items/89cd7b69a8a6239d67ca. Accessed Nov. 12, 2021 (English translation provided).
Office Action issued in Corresponding Japanese Application No. 2021-510515, dated Oct. 12, 2021 (English Translation provided).
Vinayakumar et al., "Evaluating deep learning approaches to characterize and classify the DGAs at scale" *Journal of Intelligent & Fuzzy Systems* 2018, 34, 1265-1276.
International Search Report and Written Opinion issued in Corresponding PCT Application No. PCT/CN2019/087076, dated Aug. 9, 2019 (English Translation provided).
Wu, et al. "Domain name valuation model based on semantic theory and content analysis." 2009 Asia-Pacific Conference on Information Processing. IEEE, 2009, pp. 237-240.
Extended European Search Report issued in Corresponding European Application No. 19808429.5, dated Jun. 2, 2021.
Shi et al., "Malicious Domain Name Detection Based on Extreme Machine Learning" *Neural Process Letters*, 2018, 48, 1347-1357.
Goldberg, Yoav. "A Primer on Neural Network Models for Natural Language Processing." *Journal of Artificial Intelligence Research*, vol. 57, 2016, pp. 345-420.
Goldberg, Yoav. "Neural Network Methods for Natural Language Processing." *Synthesis Lectures on Human Language Technologies*, edited by Graeme Hirst, vol. 10, No. 1, Morgan & Claypool Publishers, 2017.
Summons to attend oral proceedings issued in corresponding European Application No. 19808429.5, dated Dec. 20, 2024.

* cited by examiner

DOMAIN NAME IDENTIFICATION

CROSS REFERENCE TO RELATED APPLICATIONS

The present application is a national phase under 35 U.S.C. § 371 of International Application No. PCT/CN2019/087076, which claims priority to Chinese Patent Application No. 201810489709.0, filed with the China National Intellectual Property Administration on May 21, 2018 and entitled "A METHOD AND APPARATUS FOR IDENTIFYING A DOMAIN NAME", each of which are incorporated herein by reference in their entirety.

BACKGROUND

Currently, in the process of accessing a network, a terminal can acquire an Internet protocol (i.e. IP for short) address of a target terminal through a domain name system (i.e. DNS for short) server. The terminal then establishes a communication link with the target terminal through the IP address of the target terminal, and then interacts data with the target terminal. In actual networking, a terminal is at a risk of being infected by a virus program. The infected terminal will transmit data with a malicious terminal set by a lawbreaker, which brings a large security risk to the network.

In order to prevent data transmission between the infected terminal and the malicious terminal, after receiving a domain name resolution request sent by the terminal, the DNS server performs character extraction on a domain name included in the domain name resolution request. Whether the domain name is legitimate is determined by comparing the character with a stored character feature library.

DETAILED DESCRIPTION

The above objects, features and advantages of the present disclosure will become more apparent from the following detailed description in combination with drawings and specific implementations. An example of the present disclosure provides a method for identifying a domain name, and the method is applicable to a network device having a domain name resolution function, for example, a DNS server.

In the event that a terminal (which can be called a source device) needs to send a packet to a server (which can be called a destination device), the source device first acquires a domain name of the destination device. For example, when a user wants to visit a website, the user may input a domain name of the website. The source device sends a domain name resolution request to the network device. The domain name resolution request includes a domain name of the destination device. The network device determines an IP address corresponding to the domain name according to a pre-stored correspondence between domain names and IP addresses. The network device then sends the IP address to the source device, so that the source device can send a packet to the destination device by this IP address.

In the example of the present disclosure, the network device is provided with a domain name feature analysis model and a domain name classification model. The domain name feature analysis model includes an input and output gate. When the network device receives a domain name resolution request sent by the terminal, the network device identifies whether the domain name included in the domain name resolution request is a legal domain name by using the domain name feature analysis model and the domain name classification model.

If the domain name is an illegal domain name, the network device does not send a response message to the terminal, so as to prevent the source device from sending a data packet to the malicious terminal. If the domain name is a legal domain name, the network device sends a response message carrying an IP address corresponding to the domain name to the terminal, so that the terminal accesses a terminal corresponding to this IP address.

Figure 1:
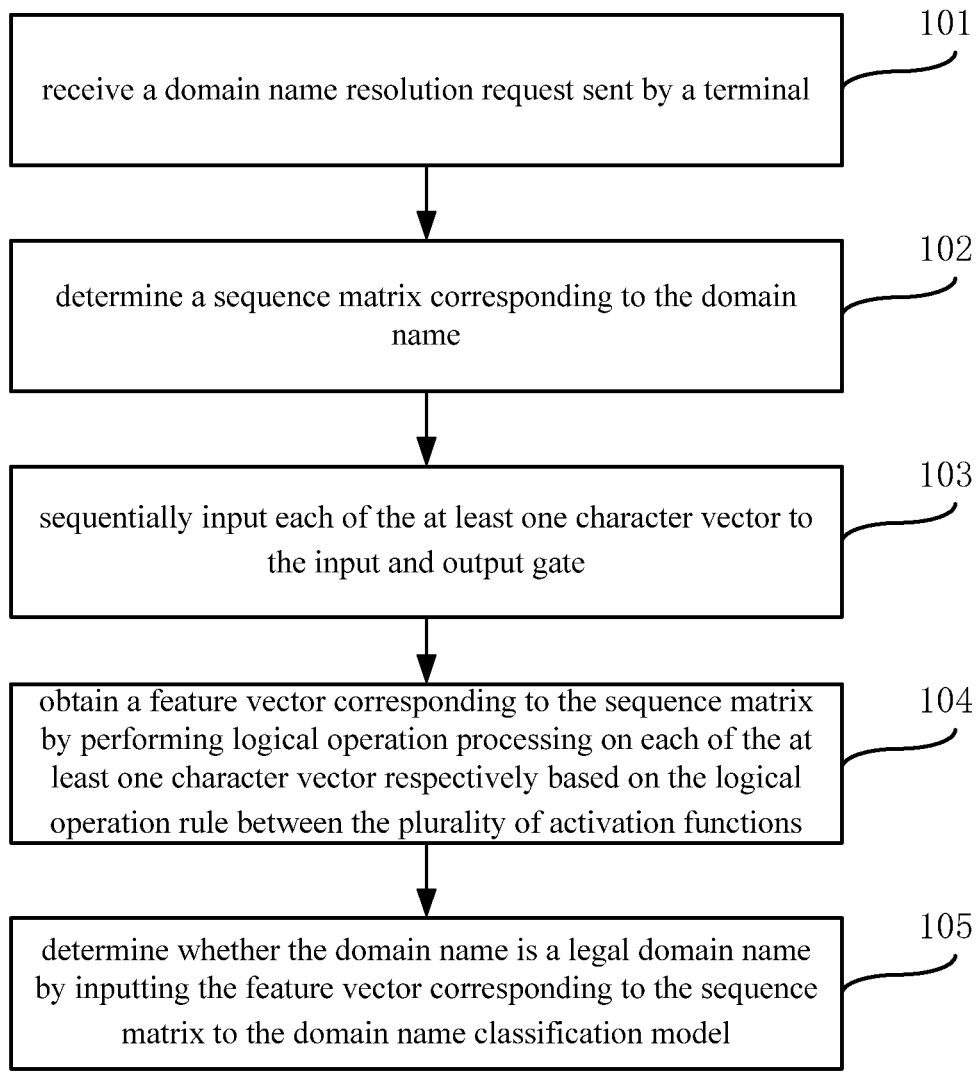
FIG. 1 is a flowchart of a method for identifying a domain name according to an example of the present disclosure.

The method for identifying a domain name according to the example of the present disclosure can improve the accuracy of identifying a domain name, thereby improving the security of user data. As shown in FIG. 1, the method includes the following blocks 101-105.

At block 101, a network device receives a domain name resolution request sent by a terminal.

The domain name resolution request includes a domain name to be identified, and the domain name includes at least one character.

In the example of the present disclosure, in order to send a packet to the destination device, the source device (i.e. the terminal) first sends a domain name resolution request to the network device. The domain name resolution request carries a domain name of the destination device (i.e. a domain name to be identified). After receiving the domain name resolution request, the network device acquires the domain name to be identified by resolving the domain name resolution request.

The destination device is a network device with a domain name, which may be a host, a server, a virtual machine or the like.

At block 102, the network device determines a sequence matrix corresponding to the domain name.

In the example of the present disclosure, after acquiring the domain name to be identified, the network device calculates the sequence matrix corresponding to the domain name. The sequence matrix includes at least one character vector. Each of the at least one character vector corresponds to each of the at least one character one to one. The calculation method of the sequence matrix will be described in detail later.

At block 103, the network device sequentially inputs each of the at least one character vector to the input and output gate.

In the example of the present disclosure, the domain name feature analysis model includes an input and output gate. The input and output gate includes a logical operation rule between a plurality of activation functions. The activation function may be a tanh activation function. After determining the sequence matrix, the network device sequentially inputs each character vector included in the sequence matrix to the input and output gate. The formula of the tanh activation function is:

$$F(x)=(e^x-e^{-x})/(e^x+e^{-x}) \quad (1)$$

where e is the base of the natural logarithm.

The network device sequentially inputs each character vector in the sequence matrix to the input and output gate to calculate a feature vector corresponding to the sequence matrix.

At block 104, the network device obtains a feature vector corresponding to the sequence matrix by performing logical operation processing on each of the at least one character vector respectively based on the logical operation rule between the plurality of activation functions.

In the example of the present disclosure, for each character vector input to the input and output gate, the network device obtains the feature vector corresponding to the sequence matrix by performing logical operation processing on the character vector input to the input and output gate through the logical operation rule between the plurality of activation functions. The logical operation processing includes arithmetic and logical operations. The specific process of performing logical operation processing on the character vector through the input and output gate will be descried in detail later.

At block 105, the network device determines whether the domain name is a legal domain name by inputting the feature vector corresponding to the sequence matrix into the domain name classification model.

In the example of the present disclosure, the domain name classification model may be a full connection layer in which the number of neurons is 1. The network device inputs the feature vector corresponding to the sequence matrix into the domain name classification model, and the domain name classification model outputs a classification result corresponding to the feature vector. The classification result is used to indicate a probability that the domain name is an illegal domain name. The network device determines whether the domain name is a legal domain name according to the classification result.

For example, a classification result corresponding to a legal domain name is 0, a classification result corresponding to an illegal domain name is 1, and a preset threshold is 0.6. If the classification result corresponding to the domain name is 0.8>0.6, the network device determines that the domain name is an illegal domain name. If the classification result corresponding to the domain name is 0.2<0.6, the network device determines that the domain name is a legal domain name.

In the example of the present disclosure, the network device receives a domain name resolution request sent by the terminal. The domain name resolution request includes a domain name to be identified, and the domain name includes at least one character. The network device determines a sequence matrix corresponding to the domain name. The sequence matrix includes at least one character vector, and each of the at least one character vector corresponds to each of the at least one character one to one.

The network device sequentially inputs each of the at least one character vector to the input and output gate. The input and output gate includes a logical operation rule between a plurality of activation functions. The network device obtains a feature vector corresponding to the sequence matrix by performing logical operation processing on each of the at least one character vector respectively based on the logical operation rule between the plurality of activation functions. The network device determines whether the domain name is a legal domain name by inputting the feature vector corresponding to the sequence matrix into the domain name classification model.

Based on the example of the present disclosure, it is not necessary to set a character feature library by the technician, and the accuracy of identifying a domain name is improved.

In an example, if the network device determines that the domain name is a legal domain name, the network device sends a response message to the terminal, wherein the response message carries an IP address corresponding to the domain name.

In the example of the present disclosure, if the domain name is a legal domain name, the network device determines the IP address corresponding to the domain name according to the pre-stored correspondence between domain names and IP addresses. The network device then sends the determined IP address to the terminal, so that the terminal sends a packet to the destination device by this IP address. If the domain name is an illegal domain name, the network device does not send a response message to the terminal, or the network device sends a prompt message to the terminal, wherein the prompt message is used to indicate that the domain name requested by the terminal is an illegal domain name.

In the method for identifying a domain name according to the example of the present disclosure, the network device receives a domain name resolution request sent by the terminal. The domain name resolution request includes a domain name to be identified, and the domain name includes at least one character. The network device determines a sequence matrix corresponding to the domain name. The sequence matrix includes at least one character vector, and each of the at least one character vector corresponds to each of the at least one character one to one.

The network device then sequentially inputs each of the at least one character vector to the input and output gate. The input and output gate includes a logical operation rule between a plurality of activation functions. The network device obtains a feature vector corresponding to the sequence matrix by performing logical operation processing on each of the at least one character vector respectively based on the logical operation rule between the plurality of activation functions.

The network device determines whether the domain name is a legal domain name by inputting the feature vector corresponding to the sequence matrix into the domain name classification model.

Based on the example of the present disclosure, it is not necessary to set a character feature library by the technician, and the accuracy of identifying a domain name is improved.

Figure 2:
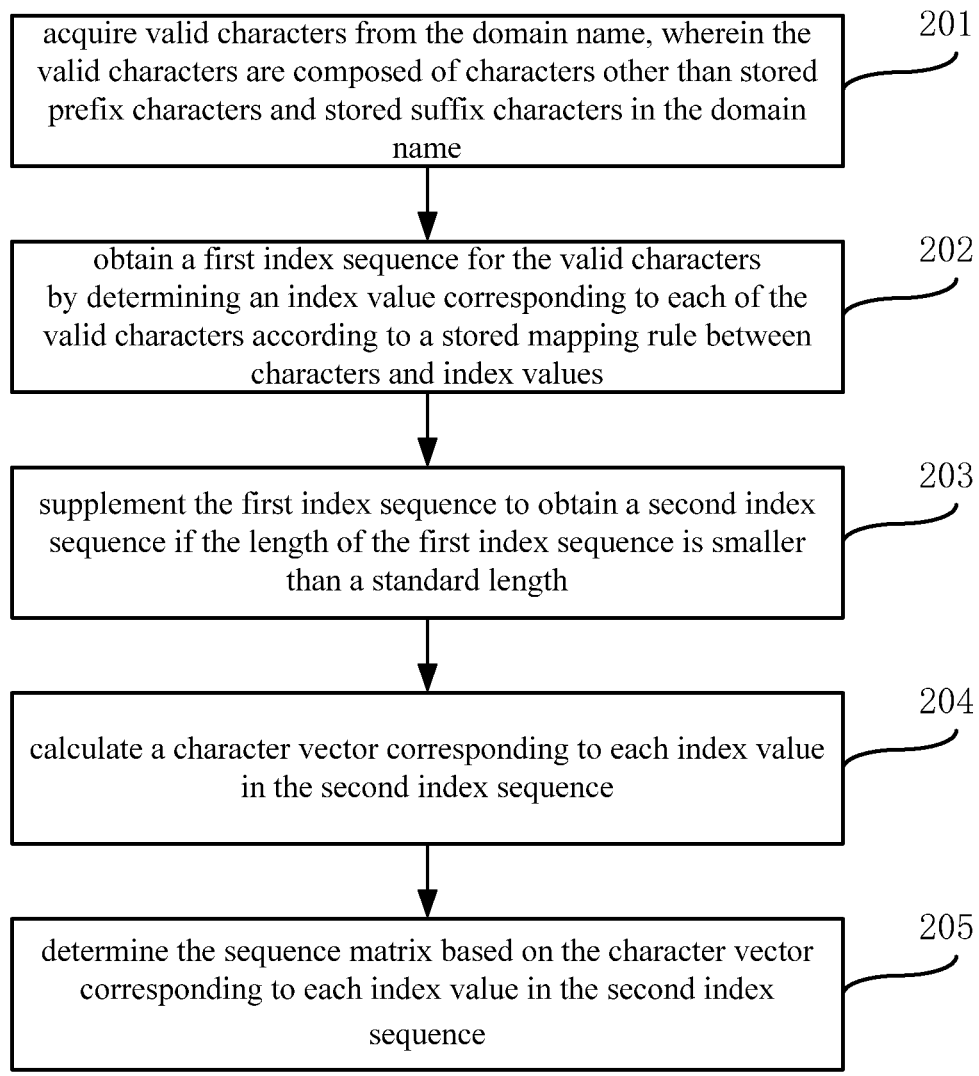
FIG. 2 is a flowchart of a method for determining a sequence matrix according to an example of the present disclosure.

An example of the present disclosure further provides a method for determining a sequence matrix corresponding to a domain name. As shown in FIG. 2, the method includes the following blocks 201-205.

At block 201, the network device acquires valid characters from the domain name, wherein the valid characters are composed of characters other than stored prefix characters and stored suffix characters in the domain name.

In the example of the present disclosure, the network device stores prefix characters and suffix characters that are commonly used in domain names. The prefix characters are a network name, such as "www.", "ftp.", and "smtp.", etc.; the suffix characters are a top-level domain name, such as ".com", ".net", ".edu", and ".gov", etc. The network device identifies the prefix characters and the suffix characters included in the domain name, and then extracts characters other than the prefix characters and the suffix characters. The extracted characters are valid characters. For example, a domain name is "www.google.com". A character string other than "www." and ".com" is extracted to obtain "google".

At block 202, the network device obtains a first index sequence for the valid characters by determining an index value corresponding to each of the valid characters according to a stored mapping rule between characters and index values.

In the example of the present disclosure, the network device stores characters that may appear in a domain name, and assigns an index value to each character, thereby generating a mapping rule between characters and index values.

In a possible implementation, the network device stores characters that may appear in a domain name, and then sequentially numbers each character from 1. The number corresponding to each character is the index value corresponding to each character. For example, characters that appear are a, b, c, and d. The network device determines that the number corresponding to a is 1, the number corresponding to b is 2, the number corresponding to c is 3, and the number corresponding to d is 4. At this time, the index value of a is 1, the index value of b is 2, the index value of c is 3, and the index value of d is 4. Referring to Table 1, the mapping rule between characters and index values provided by the example of the present disclosure is shown.

TABLE 1

| character | index value |
|---|---|
| g | 1 |
| o | 2 |
| f | 3 |
| a | 4 |
| l | 5 |
| e | 6 |

After acquiring the valid characters, the network device obtains a first index sequence for the valid characters by determining an index value corresponding to each of the valid characters according to the stored mapping rule between characters and index values. For example, the domain name is "www.google.com". The valid characters are "google". Based on the mapping rule between characters and index values shown in Table 1, the first index sequence is 1, 2, 2, 1, 5, 6.

At block 203, when the length of the first index sequence is smaller than a standard length, the network device supplements the first index sequence to obtain a second index sequence.

The second index sequence has the standard length.

In the example of the present disclosure, after obtaining the first index sequence for the valid characters, the network device determines whether the length of the first index sequence equals to the standard length. The standard length can be set by the technician according to experiences, and the standard length is greater than a upper limit of the length of the first index sequence. For example, the standard length can be set to 60 characters.

If the length of the first index sequence is smaller than the standard length, the network device supplements the first index sequence to obtain the second index sequence, wherein the second index sequence has the standard length. It can be understood that it is easier to program if valid characters are represented by an index sequence with standard length.

In a possible implementation, the network device may supplement the first index sequence by a preset character. The preset character, for example, is 0. The network device may add the preset character before the first character of the first index sequence, or may add the preset character after the last character of the first index sequence.

For example, the first index sequence is 1, 2, 2, 1, 5, 6, and the standard length is 60 characters, and thus the second index sequence is 1, 2, 2, 1, 5, 6, 0, 0, . . . , 0, that is, 54 zeros are added after the character 6.

At block 204, the network device calculates a character vector corresponding to each index value in the second index sequence.

In the example of the present disclosure, the network device stores a embedding layer neural network, and the embedding layer neural network can be used to convert any character into a character vector. The network device can input the second index sequence to the embedding layer neural network to calculate a character vector corresponding to each index value in the second index sequence. The calculated character vector can be a 128-dimensional vector.

The process of calculating a character vector corresponding to each character through the embedding layer neural network is known in the prior art, which is not described in this example. By calculating the character vector through the embedding layer neural network, the similarity between characters and the correlation between characters in the context can be effectively learned.

At block 205, the network device determines the sequence matrix based on the character vector corresponding to each index value in the second index sequence.

In the example of the present disclosure, the network device calculates a character vector corresponding to each index value in the second index sequence, and then, the network device determines the sequence matrix based on the character vector corresponding to each index value in the second index sequence.

For example, the second index sequence is 1, 2, 2, 1, 5, 6, 0, 0, . . . , 0. The second index sequence has a length of 60 characters, that is, 54 zeros are added after the character 6. The network device inputs the second index sequence to the embedding layer neural network, and outputs character vectors $a_1, a_2, a_3, \ldots, a_{60}$, wherein $a_i$ is a 128-dimensional vector. That is, sixty 128-dimensional character vectors are obtained. The network device determine a sequence matrix of 60*128 by using sixty 128-dimensional character vectors.

In the example of the present disclosure, the network device converts the domain name identification problem into a natural language processing problem. The network device sets an index value corresponding to each character, and then performs character vectorization on the index value, which is easier to program.

Another implementation for determining the sequence matrix is also provided in the example of the present disclosure, in which the network device may not extract valid characters.

Specifically, after acquiring the domain name to be identified, the network device obtains an index sequence corresponding to the domain name (which can be referred to as a third index sequence for ease of description) by determining an index value corresponding to each character included in the domain name. The network device determines whether the length of the third index sequence equals to the standard length. If the length of the third index sequence is smaller than the standard length, the network device supplements the third index sequence to obtain the fourth index sequence, wherein the fourth index sequence has the standard length. The network device then calculates a character vector corresponding to each index value in the fourth index sequence. The network device thus determines the sequence matrix by using the character vector corresponding to each index value in the fourth index sequence.

In the method for determining a sequence matrix corresponding to a domain name according to the example of the present disclosure, the network device first extracts characters with identification function (which may be referred to as valid characters) from the domain name, and then determines the sequence matrix corresponding to the domain name according to the valid characters. In this case, it is not necessary to calculate all the characters included in the domain name, improving the efficiency of determining the sequence matrix.

Figure 3:
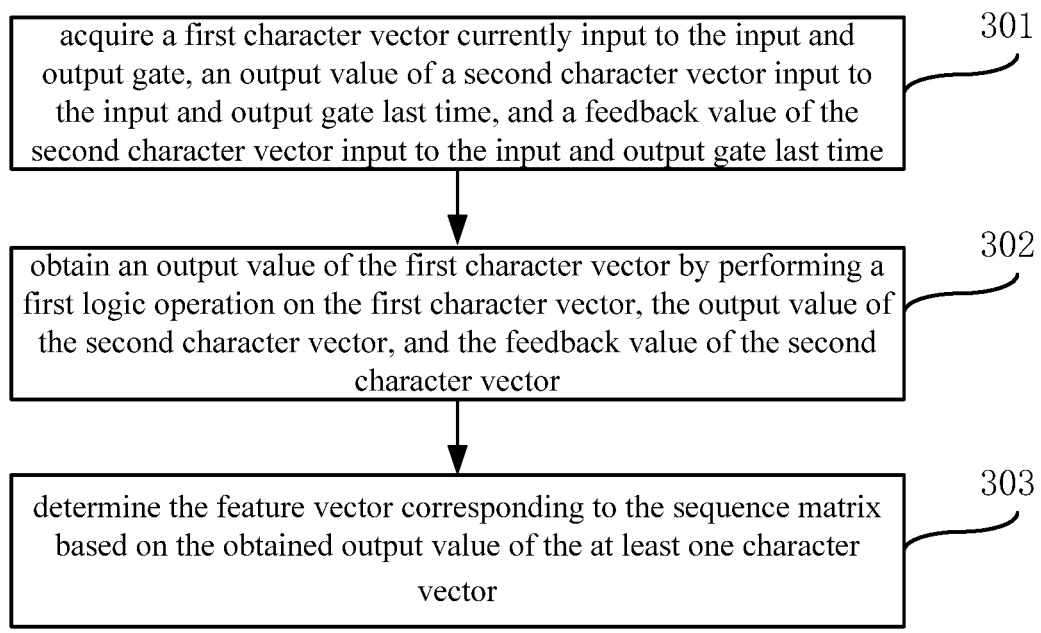
FIG. 3 is a flowchart of a method for calculating a feature vector according to an example of the present disclosure.

An example of the present disclosure further provides a method for calculating a character vector. As shown in FIG. 3, the method includes the following blocks 301-303.

At block 301, the network device acquires a first character vector currently input to the input and output gate, an output value of a second character vector input to the input and output gate last time, and a feedback value of the second character vector input to the input and output gate last time.

In the example of the present disclosure, the network device sequentially inputs each character vector included in the sequence matrix to the input and output gate. For convenience of description, the character vector currently input to the input and output gate is referred to as a first character vector, and the character vector that was input to the input and output gate last time is referred to as a second character vector.

The network device acquires the first character vector, the output value of the second character vector, and the feedback value of the second character vector. For a character vector that is first input to the input and output gate, an output value and a feedback value of a character vector input to the input and output gate last time are all 0. The calculation method of the feedback value will be described in detail later.

For example, the network device first inputs the character vector $a_1$ to the input and output gate and outputs an output value of $a_1$, and inputs the character vector $a_1$ to a feedback gate and outputs a feedback value of $a_1$. The network device then inputs the character vector $a_2$ to the input and output gate and outputs an output value of $a_2$. The network device acquires the output values of $a_2$ and $a_1$ and the feedback value of $a_1$ for subsequent operations.

At block 302, the network device obtains an output value of the first character vector by performing a first logic operation on the first character vector, the output value of the second character vector, and the feedback value of the second character vector.

Figure 4:
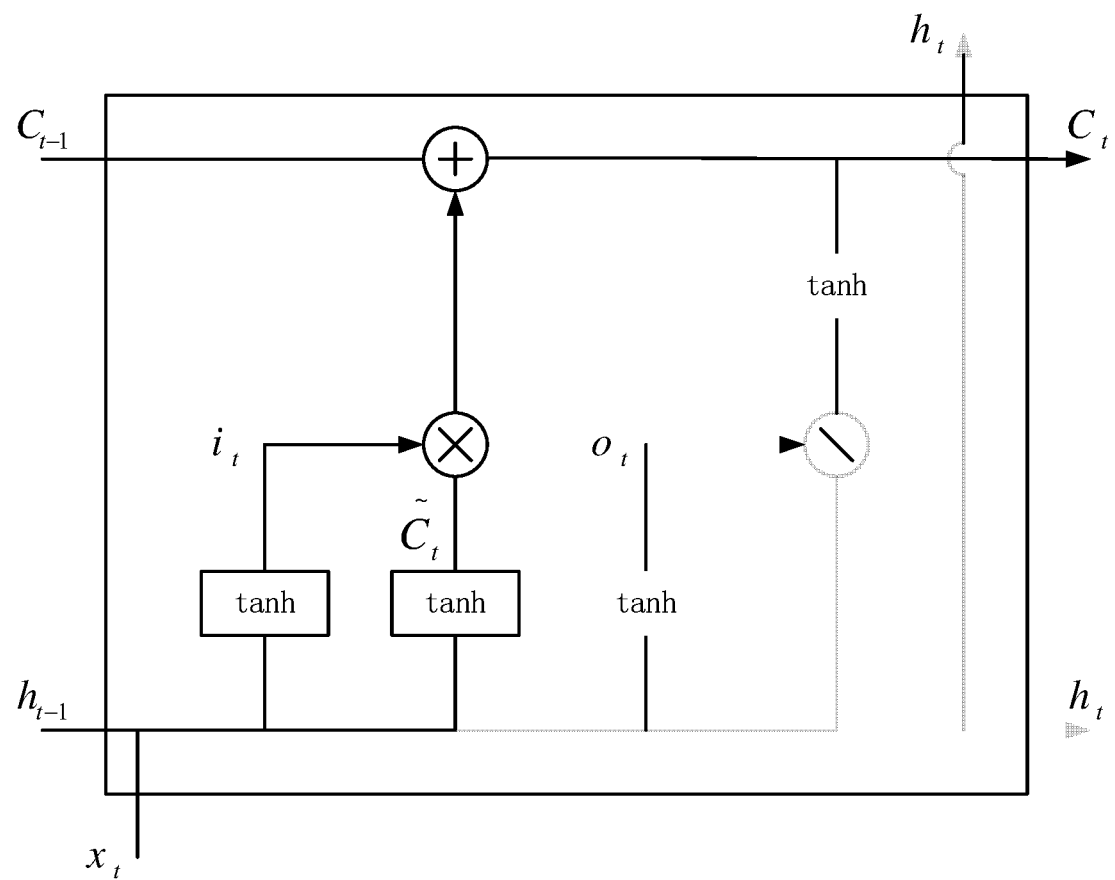
FIG. 4 is a diagram shows the logic structure of an input and output gate according to an example of the present disclosure.

FIG. 4 shows a logical structure of an input and output gate according to the example of the present disclosure. Based on the input and output gate as shown in FIG. 4, the network device obtains an output value of the first character vector by performing the first logic operation on the first character vector, the output value of the second character vector, and the feedback value of the second character vector. The specific operation process includes the following steps 1-5.

At step 1, the network device obtains a first weighted result by performing a first weighted calculation on the first character vector and the feedback value of the second character vector according to a first weight matrix.

At step 2, the network device obtains a second weighted result by performing a second weighted calculation on the first character vector and the feedback value of the second character vector according to a second weight matrix.

The first weight matrix and the second weight matrix may be the same or not.

At step 3, the network device obtains a first operation result by inputting the first weighted result and a first offset parameter to a first activation function. The corresponding calculation formula may be as follows:

$$i_t = \tanh(w_i * [h_{t-1}, x_t] + b_i) \quad (2)$$

where, the first activation function is a tanh activation function, $h_{t-1}$ is the feedback value of the character vector last input to the input and output gate, $x_t$ is the character vector currently input to the input and output gate, and $w_i$ is the first weight matrix, and $b_i$ is the first offset parameter, and $i_t$ is the first operation result.

At step 4, the network device obtains a second operation result by inputting the second weighted result and a second offset parameter to a second activation function. The corresponding calculation formula may be as follows:

$$\tilde{C}_t = \tanh(w_c * [h_{t-1}, x_t] + b_c) \quad (3)$$

where, the second activation function is a tanh activation function, $w_c$ is the second weight matrix, $b_c$ is the second offset parameter, $\tilde{C}_t$ is the second operation result, and $h_{t-1}$ and $x_t$ are the same as the $h_{t-1}$ and $x_t$ in formula (2).

The above $i_t$ and $\tilde{C}_t$ are determined by the feedback value of the second character vector and the first character vector, and $i_t$ represents a final input data in the current calculation, determined by the feedback value of the second character vector and the first character vector; $\tilde{C}_t$ represents data that needs to be retained in a feedback value used in the current calculation and determined by the feedback value of the second character vector and the first character vector.

In an example, the first offset parameter and the second offset parameter may be the same or not.

At step 5, the network device obtains the output value corresponding to the first character vector by multiplying the first operation result by the second operation result, and adding the multiplied result with the output value of the second character vector. The corresponding calculation formula may be as follows:

$$C_t(i_t * \tilde{C}_t) + C_{t-1} \quad (4)$$

where, $C_t$ is the output value of the first character vector, $C_{t-1}$ is the output value of the second character vector, $i_t$ is the first operation result, and $\tilde{C}_t$ is the second operation result.

In an example, the network device stores the output value of the first character vector for subsequent logical operation processing.

At block 303, the network device determines a feature vector corresponding to the sequence matrix by the output value of the at least one character vector.

In the example of the present disclosure, based on the above processing, for any character vector, after inputting this character vector to the input and output gate, the network device obtains the output value of this character vector. In this way, the network device can obtain the output value of each character vector included in the sequence matrix. The network device determines the feature vector corresponding to the sequence matrix based on the output value of each character vector.

For example, the sequence matrix includes $a_1$, $a_2$, $a_3$. The output value of $a_1$ is x, the output value of $a_2$ is y, and the output value of $a_3$ is z. Thus the feature vector corresponding to the sequence matrix is (x, y, z).

In the example of the present disclosure, the logic operation of the input and output gate in the existing recurrent neural network is simplified, the processing amount of the network device is reduced, and the accuracy of identifying a domain name is improved.

Further, in the example of the present disclosure, the domain name feature analysis model further includes a feedback gate. After obtaining the output value of the character vector currently input to the input and output gate, the network device further calculates a feedback value of the character vector currently input to the input and output gate.

The specific process may include: obtaining, by the network device, the feedback value of the first character vector by performing a second logic operation on the output value of the first character vector, the first character vector, and the feedback value of the second character vector.

The feedback value is used by the network device to calculate an output value of a character vector input to the input and output gate next time.

In the example of the present disclosure, for any character vector, the network device inputs the character vector to the input and output gate of the domain name feature analysis model. At the same time, the network device also inputs the character vector to the feedback gate of the domain name feature analysis model. That is, the character vector currently input to the input and output gate and the character vector currently input to the feedback gate are the same character vector. Similarly, the character vector input to the input and output gate last time and the character vector input to the feedback gate last time are the same one.

It can be understood that for a character vector that is first input to the feedback gate, a feedback value of a character vector input to the feedback gate last time is 0.

Figure 5:
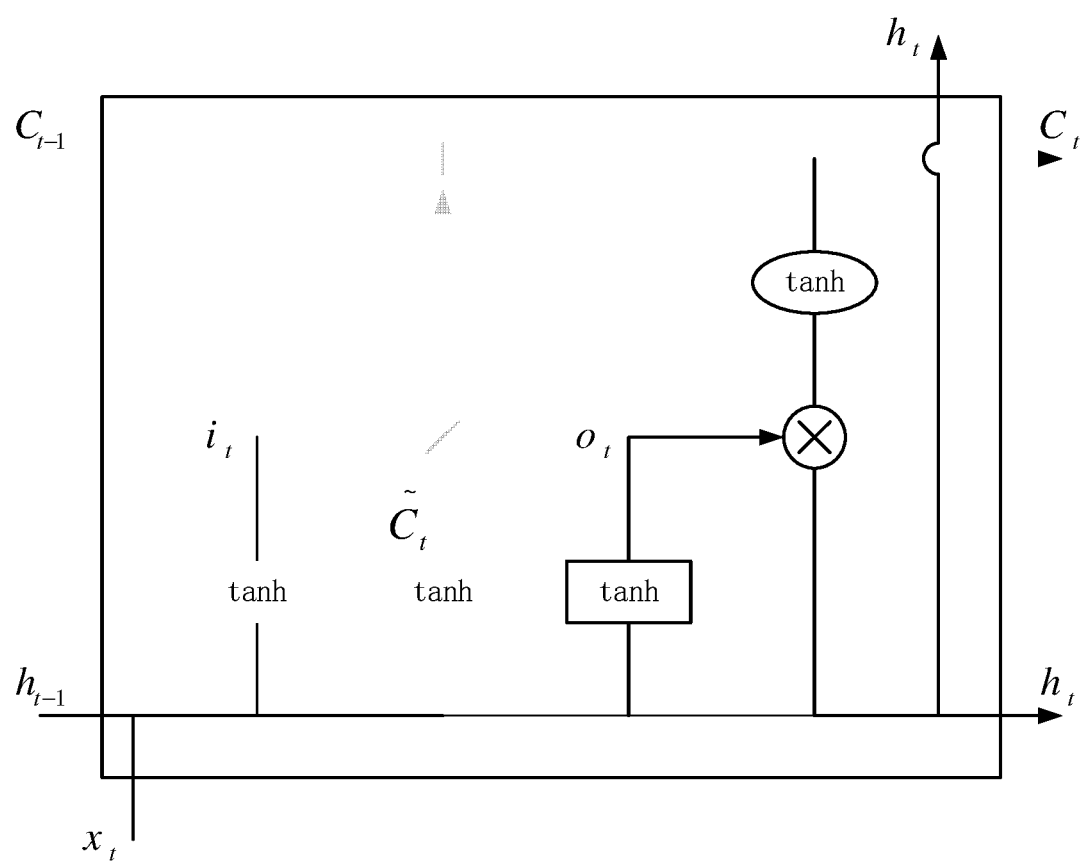
FIG. 5 is a diagram shows the logic structure of a feedback gate according to an example of the present disclosure.

FIG. 5 shows a logical structure of the feedback gate according to the example of the present disclosure. Based on the feedback gate as shown in FIG. 5, the network device obtains a feedback value of the character vector currently input to the feedback value by performing the second logic operation on the output value of the first character vector, the first character vector, and the feedback value of the second character vector. The specific operation process includes the following steps 1-4.

At step 1, the network device obtains a third weighted result by performing a third weighted calculation on the first character vector and the feedback value of the second character vector according to a third weight matrix.

At step 2, the network device obtains a third operation result by inputting the third weighted result and a third offset parameter to a third activation function. The corresponding calculation formula may be as follows:

$$O_r=\tanh(w_o*[h_{t-1},x_t]+b_o) \quad (5)$$

where the third activation function is a tanh activation function, $h_{t-1}$ is the feedback value of the first character vector, $x_t$ is the first character vector, $w_o$ is the third weight matrix, $b_o$ is the third offset parameter, and $O_r$ is the third operation result. $O_r$ represents data selected from the feedback value of the second character vector and the first character vector that needs to be fed back to the next calculation, and data that needs to be stored in the current output (i.e., $C_t$).

At step 3, the network device obtains a fourth operation result by inputting the output value of the first character vector to a fourth activation function.

At step 4, the network device obtains the feedback value of the first character vector by multiplying the third operation result by the fourth operation result. The corresponding calculation formula may be as follows:

$$h_t=O_t*\tanh(C_t) \quad (6)$$

where the fourth activation function is a tanh activation function, $C_t$ is the output value of the first character vector, $O_t$ is the third operation result, and $h_t$ is the feedback value of the first character vector.

In an example, the network device stores the feedback value of the first character vector for subsequent logical operation processing.

In the above formula (2), $w_i'[h_{t-1},x_t]=w_1*h_{t-1}+w_2*x_t$. In the example of the present disclosure, the network device converts each character into a 128-dimensional character vector through the embedding layer. Correspondingly, $h_{t-1}$ and $x_t$ are both 128-dimensional vectors, $b_i$ is a 128-dimensional vector, and $w_i$ is a matrix of 128*128. $w_1*h_{t-1}$ is a vector of 128*1, $w_2*x_t$ is also a vector of 128*1, and $w_i*[h_{t-1},x_t]+b_i$ is a 128-dimensional vector.

Similarly, in the above formula (3), $w_c$ is a matrix of 128*128, and $b_c$ is a 128-dimensional vector. In the above formula (5), $w_o$ is a matrix of 128*128, and $b_o$ is a 128-dimensional vector. In the above formula (4), $C_t$ is a matrix of 128*128.

In the example of the present disclosure, the logic operation of the feedback gate in the existing recurrent neural network is simplified, the processing amount of the network device is reduced, and the accuracy of identifying a domain name is improved.

Figure 6:
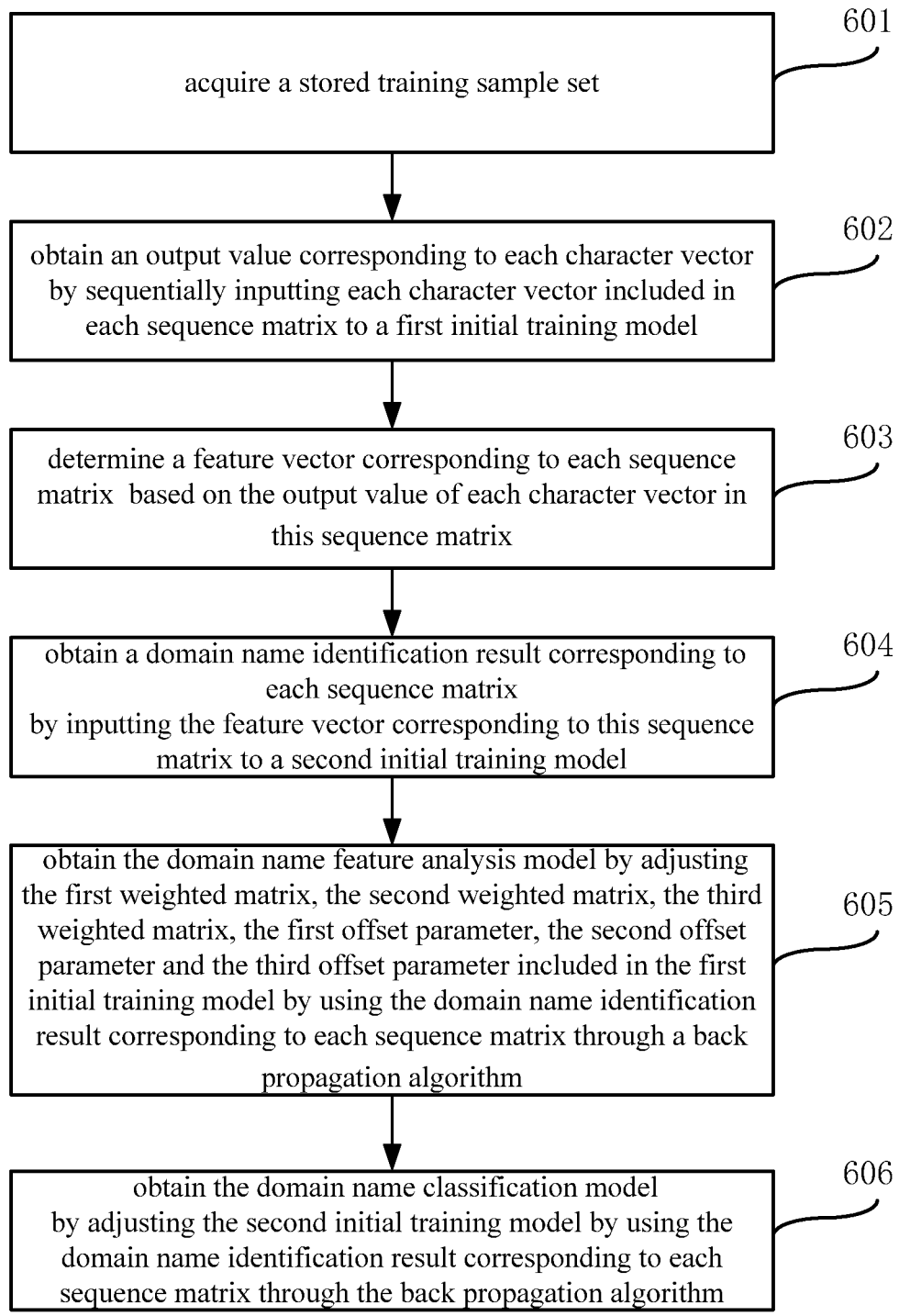
FIG. 6 is a flowchart of a method for training a domain name feature analysis model and a domain name classification model according to an example of the present disclosure.

An example of the present disclosure further provides a method for training a domain name feature analysis model and a domain name classification model, which may be performed by a network device, wherein the network device may be a network device having a data processing function. As shown in FIG. 6, the method includes the following blocks 601-606.

At block 601, the network device acquires a stored training sample set.

The training sample set includes a plurality of positive samples and a plurality of negative samples. Each of the positive samples is a sequence matrix corresponding to a legal domain name, and each of the negative samples is a sequence matrix corresponding to an illegal domain name.

In the example of the present disclosure, the technician inputs a plurality of legal domain names in advance in the network device. The network device obtains the positive sample by determining a sequence matrix corresponding to each legal domain name. The network device may also acquire illegal domain names, and the illegal domain names may be obtained by the network device through crawling from the network; or may be generated by the network device through a domain name generation algorithm (i.e., DGA for short). The network device obtains the negative sample by determining a sequence matrix corresponding to each illegal domain name.

In this way, the network device can obtain a training sample set. The specific process of determining a sequence matrix refers to the related description of block 102, which is not described herein again.

At block 602, the network device obtains an output value corresponding to each character vector included in each sequence matrix by sequentially inputting each character vector included in each sequence matrix to a first initial training model.

The first initial training model may be a recurrent neural network, and the recurrent neural network includes an input and output gate and a feedback gate.

At block 603, the network device determines a feature vector corresponding to each sequence matrix based on the output value of each character vector in this sequence matrix.

In the example of the present disclosure, the specific process of blocks 602 and 603 may refer to the related description of blocks 301 to 303, which is not described herein again.

At block 604, the network device obtains a domain name identification result corresponding to each sequence matrix by inputting the feature vector corresponding to this sequence matrix to a second initial training model.

The second initial training model is a full connection layer.

The process of this block may refer to the related description of block 105, which is not described herein again.

At block 605, the network device obtains the domain name feature analysis model by adjusting the first weighted matrix, the second weighted matrix, the third weighted matrix, the first offset parameter, the second offset parameter and the third offset parameter included in the first initial training model by using the domain name identification result corresponding to each sequence matrix through a back propagation algorithm.

The back propagation algorithm may be a back propagation trough time (i.e. BPTT for short) algorithm.

In the example of the present disclosure, the network device obtains the domain name feature analysis model by adjusting the first weighted matrix, the second weighted matrix, the first offset parameter and the second offset parameter included in the input and output gate and the third weighted matrix and the third offset parameter included in the feedback gate, according to the domain name identification result corresponding to each sequence matrix (i.e., each sample) and an actual classification result of a domain name corresponding to the sequence matrix (such as a legal domain name or an illegal domain name), through the BPTT algorithm.

The process of adjusting the recurrent neural network by the BPTT algorithm is known in the prior art, which is not described in the example of the present disclosure.

At block 606, the network device obtains the domain name classification model by adjusting the second initial training model by using the domain name identification result corresponding to each sequence matrix through the back propagation algorithm.

In the example of the present disclosure, the full connection layer includes a weight vector, which is a 128-dimensional vector. The network device obtains the domain name feature analysis model by adjusting the value of the weight vector included in the full connection layer according to the domain name identification result corresponding to each sequence matrix (i.e., each sample) and the actual classification result of the domain name corresponding to the sequence matrix (such as a legal domain name or an illegal domain name), through the back propagation algorithm.

The process of adjusting the full connection layer by the back propagation algorithm is known in the prior art, which is not described in the example of the present disclosure.

Figure 7:
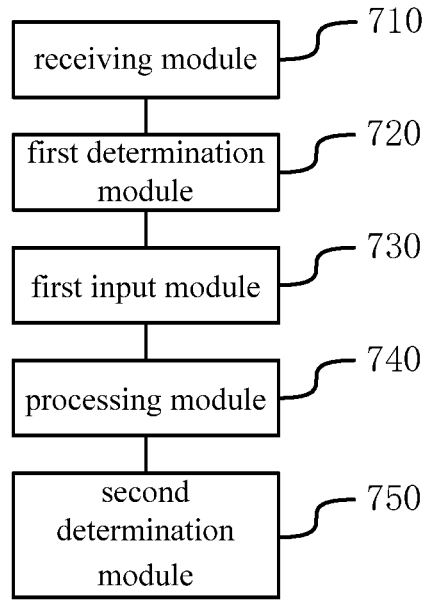
FIG. 7 is a schematic structural diagram of an apparatus for identifying a domain name according to an example of the present disclosure.

In the examples of the present disclosure, the method examples are described as combinations of a series of actions for the sake of brief description, but those skilled in the art should understand that the examples of the present disclosure are not limited by the order of the actions described. Because some blocks may be performed in other order or simultaneously in accordance with examples of the present disclosure. In addition, those skilled in the art should understand that the examples described in the specification are all preferred examples, and the actions involved are not necessary for the examples of the present disclosure. Referring to FIG. 7, FIG. 7 shows an apparatus for identifying a domain name according to an example of the present disclosure. The apparatus is applicable to a network device. The network device is provided with a domain name feature analysis model and a domain name classification model. The domain name feature analysis model includes an input and output gate. The apparatus includes a receiving module 710, a first determination module 720, a first input module 730, a processing module 740, and a second determination module 750. The description of each module is as follows.

The receiving module 710 is to receive a domain name resolution request sent by a terminal, wherein the domain name resolution request includes a domain name to be identified, and the domain name includes at least one character.

The first determination module 720 is to determine a sequence matrix corresponding to the domain name, wherein the sequence matrix includes at least one character vector, and each of the at least one character vector corresponds to each of the at least one character one to one.

The first input module 730 is to sequentially input each of the at least one character vector to the input and output gate, wherein the input and output gate includes a logic operation rule between a plurality of activation functions.

The processing module 740 is to obtain a feature vector corresponding to the sequence matrix by performing logical operation processing on each of the at least one character vector respectively based on the logical operation rule between the plurality of activation functions.

The second determination module 750 is determine whether the domain name is a legal domain name by inputting the feature vector corresponding to the sequence matrix into the domain name classification model.

In an example of the present disclosure, the first determination module 720 may include a first acquiring submodule, a first determination submodule, a supplementing submodule, a first calculation submodule, and a second determination submodule.

The first acquiring submodule is to acquire valid characters from the domain name, wherein the valid characters are composed of characters other than stored prefix characters and stored suffix characters in the domain name.

The first determination submodule is to obtain a first index sequence for the valid characters by determining an index value corresponding to each of the valid characters according to a stored mapping rule between characters and index values.

The supplementing submodule is to supplement the first index sequence to obtain a second index sequence if the length of the first index sequence is smaller than a standard length, wherein the second index sequence has the standard length.

The first calculation submodule is to calculate a character vector corresponding to each index value in the second index sequence.

The second determination submodule is to determine the sequence matrix based on the character vector corresponding to each index value in the second index sequence.

In an example of the present disclosure, the processing module 740 may include a second acquiring submodule, an operation submodule, and a third determination submodule.

The second acquiring submodule is to acquire a first character vector currently input to the input and output gate, an output value of a second character vector input to the input and output gate last time, and a feedback value of the second character vector input to the input and output gate last time.

The operation submodule is to obtain an output value of the first character vector by performing a first logic operation on the first character vector, the output value of the second character vector, and the feedback value of the second character vector.

The third determination submodule is to determine the feature vector corresponding to the sequence matrix based on the obtained output value of the at least one character vector.

In an example of the present disclosure, the operation submodule 742 may include a first calculation unit, a second calculation unit, a first input unit, a second input unit, and a third calculation unit.

The first calculation unit is to obtain a first weighted result by performing a first weighted calculation on the first character vector and the feedback value of the second character vector according to a first weight matrix.

The second calculation unit is to obtain a second weighted result by performing a second weighted calculation on the first character vector and the feedback value of the second character vector according to a second weight matrix.

The first input unit is to obtain a first operation result by inputting the first weighted result and a first offset parameter to a first activation function.

The second input unit is to obtain a second operation result by inputting the second weighted result and a second offset parameter to a second activation function.

The third calculation unit is to obtain an output value corresponding to the first character vector by multiplying the first operation result by the second operation result, and adding the multiplied result and the output value of the second character vector.

In an example of the present disclosure, the domain name feature analysis model further includes a feedback gate, and the apparatus further includes an operation module.

The operation module is to obtain a feedback value of the first character vector by performing a second logic operation on the output value of the first character vector, the first character vector, and the feedback value of the second character vector.

In an example of the present disclosure, the operation module may include a second calculation submodule, a first input submodule, a second input submodule, and a multiplication submodule.

The second calculation submodule is to obtain a third weighted result by performing a third weighted calculation on the first character vector and the feedback value of the second character vector according to a third weight matrix.

The first input submodule is to obtain a third operation result by inputting the third weighted result and a third offset parameter to a third activation function.

The second input submodule is to obtain a fourth operation result by inputting the output value of the first character vector to a fourth activation function.

The multiplication submodule is to obtain the feedback value of the first character vector by multiplying the third operation result by the fourth operation result.

In an example of the present disclosure, the apparatus further includes an acquiring module, a second input module, a third determination module, a third input module, a first adjustment module, and a second adjustment module.

The acquiring module is to acquire a stored training sample set, wherein the training sample set includes a plurality of positive samples and a plurality of negative samples; each of the positive samples is a sequence matrix corresponding to a legal domain name, and each of the negative samples is a sequence matrix corresponding to an illegal domain name.

The second input module is to obtain an output value corresponding to each character vector included in each sequence matrix by sequentially inputting each character vector included in each sequence matrix to a first initial training model.

The third determination module is to determine a feature vector corresponding to each sequence matrix based on the output value of each character vector in this sequence matrix.

The third input module is to obtain a domain name identification result corresponding to each sequence matrix by inputting the feature vector corresponding to this sequence matrix to a second initial training model.

The first adjustment module is to obtain the domain name feature analysis model by adjusting the first weighted matrix, the second weighted matrix, the third weighted matrix, the first offset parameter, the second offset parameter and the third offset parameter included in the first initial training model by using the domain name identification result corresponding to each sequence matrix, through a back propagation algorithm.

The second adjustment module is to obtain the domain name classification model by adjusting the second initial training model by using the domain name identification result corresponding to each sequence matrix, through the back propagation algorithm.

The apparatus for identifying a domain name according to the example of the present disclosure is applicable to a network device, wherein the network device is provided with a domain name feature analysis model and a domain name classification model, and the domain name feature analysis model includes an input and output gate. The network device receives a domain name resolution request sent by the terminal, wherein the domain name resolution request includes a domain name to be identified, and the domain name includes at least one character. The network device determines a sequence matrix corresponding to the domain name. The sequence matrix includes at least one character vector, and each of the at least one character vector corresponds to each of the at least one character one to one.

The network device then sequentially inputs each of the at least one character vector to the input and output gate. The input and output gate includes a logical operation rule between a plurality of activation functions. The network device obtains a feature vector corresponding to the sequence matrix by performing logical operation processing on each of the at least one character vector respectively based on the logical operation rule between the plurality of activation functions.

The network device determines whether the domain name is a legal domain name by inputting the feature vector corresponding to the sequence matrix to the domain name classification model.

Based on the example of the present disclosure, it is not necessary to set a character feature library by the technician, and the accuracy of identifying a domain name is improved.

Figure 8:
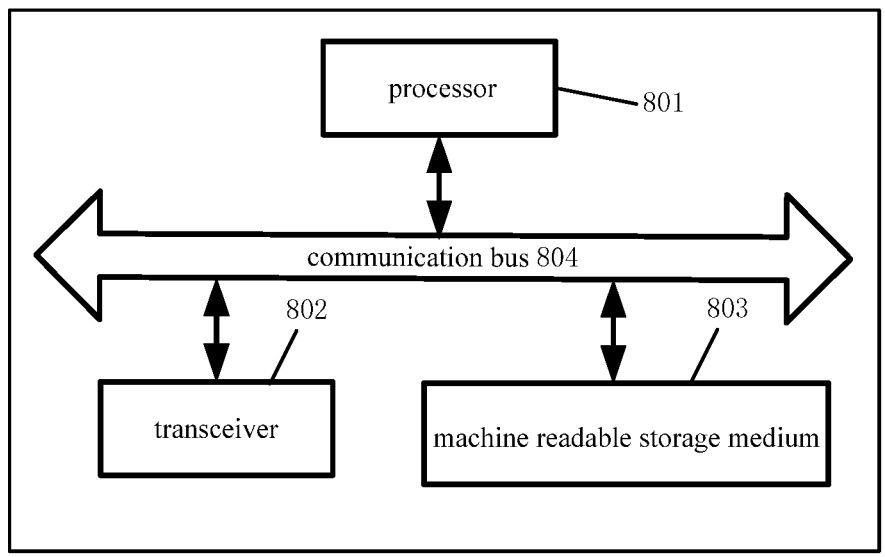
FIG. 8 is a schematic structural diagram of a network device according to an example of the present disclosure.

Corresponding to the above method example for identifying a domain name, an example of the present disclosure further provides a network device. Referring to FIG. 8, FIG. 8 shows a structural block diagram of a network device according to an example of the present disclosure.

The network device includes a processor 801, a transceiver 802, and a machine readable storage medium 803 that stores machine executable instructions.

The network device is provided with a domain name feature analysis model and a domain name classification model, wherein the domain name feature analysis model includes an input and output gate. The domain name feature analysis model and the domain name classification model can be implemented by software function modules. It can be understood that the above software function module may be loaded into a flash, and is called and executed by the processor 801; or the above software function module may be set in the processor, and is accessed and executed by the processor 801.

The transceiver 802 is to receive a domain name resolution request sent by a terminal, and transmit the domain name resolution request to the processor 801, wherein the domain name resolution request includes a domain name to be identified, and the domain name includes at least one character.

The machine executable instructions is read and executed by the processor 801 to cause the processor to:
  determine a sequence matrix corresponding to the domain name, wherein the sequence matrix includes at least one character vector, and each of the at least one character vector corresponds to each of the at least one character one to one;
  sequentially input each of the at least one character vector to the input and output gate, wherein the input and output gate includes a logic operation rule between a plurality of activation functions;
  obtain a feature vector corresponding to the sequence matrix by performing logical operation processing on each of the at least one character vector respectively based on the logical operation rule between the plurality of activation functions; and determine whether the domain name is a legal domain name by inputting the feature vector corresponding to the sequence matrix to the domain name classification model.

In an example of the present disclosure, the machine executable instructions cause the processor 801 to:
  acquire valid characters from the domain name, wherein the valid characters are composed of characters other than stored prefix characters and stored suffix characters in the domain name;
  obtain a first index sequence for the valid characters by determining an index value corresponding to each of the valid characters according to a stored mapping rule between characters and index values;
  supplement the first index sequence to obtain a second index sequence if the length of the first index sequence is smaller than a standard length, wherein the second index sequence has the standard length;
  calculate a character vector corresponding to each index value in the second index sequence;
  determine the sequence matrix based on the character vector corresponding to each index value in the second index sequence.

In an example of the present disclosure, the machine executable instructions cause the processor 801 to:
  acquire a first character vector currently input to the input and output gate, an output value of a second character vector input to the input and output gate last time, and a feedback value of the second character vector input to the input and output gate last time;
  obtain an output value of the first character vector by performing a first logic operation on the first character vector, the output value of the second character vector, and the feedback value of the second character vector; and
  determine the feature vector corresponding to the sequence matrix based on the obtained output value of the at least one character vector.

In an example of the present disclosure, the machine executable instructions cause the processor 801 to:
  obtain a first weighted result by performing a first weighted calculation on the first character vector and the feedback value of the second character vector according to a first weight matrix;
  obtain a second weighted result by performing a second weighted calculation on the first character vector and the feedback value of the second character vector according to a second weight matrix;
  obtain a first operation result by inputting the first weighted result and a first offset parameter to a first activation function;
  obtain a second operation result by inputting the second weighted result and a second offset parameter to a second activation function; and
  obtain an output value corresponding to the first character vector by multiplying the first operation result by the second operation result, and adding the multiplied result and the output value of the second character vector.

In an example of the present disclosure, the domain name feature analysis model further includes a feedback gate. The machine executable instructions further cause the processor 801 to obtain a feedback value of the first character vector by performing a second logic operation on the output value of the first character vector, the first character vector, and the feedback value of the second character vector.

The feedback value is used to calculate an output value of a character vector input to the input and output gate next time.

In an example of the present disclosure, the machine executable instructions cause the processor 801 to obtain a third weighted result by performing a third weighted calculation on the first character vector and the feedback value of the second character vector according to a third weight matrix;
  obtain a third operation result by inputting the third weighted result and a third offset parameter to a third activation function;
  obtain a fourth operation result by inputting the output value of the first character vector to a fourth activation function;
  obtain the feedback value of the first character vector by multiplying the third operation result by the fourth operation result.

In an example of the present disclosure, the machine executable instructions further cause the processor 801 to:

acquire a stored training sample set, wherein the training sample set includes a plurality of positive samples and a plurality of negative samples, each of the positive samples is a sequence matrix corresponding to a legal domain name, and each of the negative samples is a sequence matrix corresponding to an illegal domain name;

obtain an output value corresponding to each character vector included in each sequence matrix by sequentially inputting each character vector included in each sequence matrix to a first initial training model;

determine a feature vector corresponding to each sequence matrix based on the output value of each character vector in this sequence matrix;

obtain a domain name identification result corresponding to each sequence matrix by inputting the feature vector corresponding to this sequence matrix to a second initial training model;

obtain the domain name feature analysis model by adjusting the first weighted matrix, the second weighted matrix, the third weighted matrix, the first offset parameter, the second offset parameter and the third offset parameter included in the first initial training model by using the domain name identification result corresponding to each sequence matrix, through a back propagation algorithm; and obtain the domain name classification model by adjusting the second initial training model by using the domain name identification result corresponding to each sequence matrix, through the back propagation algorithm.

In an example of the present disclosure, the machine executable instructions further cause the processor 801 to:

send a response message to the terminal if the domain name is determined to be a legal domain name, wherein the response message includes a network protocol IP address corresponding to the domain name.

As shown in FIG. 8, the network device can also include a communication bus 804. The processor 801 communicates with the machine readable storage medium 803 via the communication bus 804. The communication bus 804 may be a peripheral component interconnect (PCI) bus or an extended industry standard architecture (EISA) bus. The communication bus 804 can be divided into an address bus, a data bus, a control bus, and the like.

The machine readable storage medium 803 may include a random access memory (RAM), and may also include a non-volatile memory (NVM), such as at least one disk memory. In addition, the machine readable storage medium 803 can also be at least one storage device located away from the above processor.

The processor 801 may be a general-purpose processor, including a central processing unit (CPU), a network processor (NP), and the like, and may also be a digital signal processor (DSP), an application specific integrated circuit (ASIC), a field-programmable gate array (FPGA) or other programmable logic devices, a discrete gate or transistor logic device, a discrete hardware component.

In the example of the present disclosure, the network device is provided with a domain name feature analysis model and a domain name classification model. The domain name feature analysis model includes an input and output gate. The network device receives a domain name resolution request sent by the terminal. The domain name resolution request includes a domain name to be identified, and the domain name includes at least one character. The network device determines a sequence matrix corresponding to the domain name. The sequence matrix includes at least one character vector, and each of the at least one character vector corresponds to each of the at least one character one to one.

The network device then sequentially inputs each of the at least one character vector to the input and output gate. The input and output gate includes a logical operation rule between a plurality of activation functions. The network device obtains a feature vector corresponding to the sequence matrix by performing logical operation processing on each of the at least one character vector respectively based on the logical operation rule between the plurality of activation functions.

Finally, the network device determines whether the domain name is a legal domain name by inputting the feature vector corresponding to the sequence matrix to the domain name classification model.

Based on the example of the present disclosure, it is not necessary to set a character feature library by the technician, and the accuracy of identifying a domain name is improved.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise" or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise (s) a/an . . . " and "include(s) a/an . . . " do not exclude additional identical elements in the processes, methods, articles, or devices, including the listed elements.

All of the examples in the description are described in a correlated manner, and identical or similar parts in various examples can refer to one another. The description for each example focuses on the differences from other examples. In particular, the examples of the systems are described briefly, since they are substantially similar to the example of the method. The related contents can refer to the description of the example of the method.

The examples described above are simply preferable examples of the present disclosure, and are not intended to limit the scope of protection of the present disclosure. Any modifications, alternatives, improvements, or the like within the spirit and principle of the present disclosure shall be included within the scope of protection of the present disclosure.

What is claimed is:

1. A method for identifying a domain name, which is executed by a network device, wherein the network device is provided with a domain name feature analysis model and a domain name classification model, and the domain name feature analysis model comprises an input and output gate; the method comprises:

receiving a domain name resolution request sent by a terminal, wherein the domain name resolution request comprises a domain name to be identified, and the domain name comprises at least one character;

determining a sequence matrix corresponding to the domain name, wherein the sequence matrix comprises at least one character vector, and each of the at least one character vector corresponds to each of the at least one character one to one;

sequentially inputting each of the at least one character vector to the input and output gate, wherein the input and output gate comprises a logic operation rule between a plurality of tanh activation functions;

obtaining a feature vector corresponding to the sequence matrix by performing logical operation processing on each of the at least one character vector respectively based on the logical operation rule between the plurality of tanh activation functions; and determining whether the domain name is a legal domain name by inputting the feature vector corresponding to the sequence matrix to the domain name classification model;

when the domain name is determined as an illegal domain name, sending no response message to the terminal, or sending a prompt message to the terminal indicating that the domain name requested by the terminal is the illegal domain name;

when the domain name is determined as the legal domain name, sending a response message carrying an IP address corresponding to the domain name to the terminal, so that the terminal accesses a terminal corresponding to this IP address, wherein the domain name feature analysis model further comprises a feedback gate;

obtaining the feature vector corresponding to the sequence matrix by performing logical operation processing on each of the at least one character vector respectively based on the logical operation rule between the plurality of tanh activation functions comprises:

acquiring a first character vector, an output value of a second character vector, and a feedback value of the second character vector; wherein, the first character vector is a character vector that is currently input to the input and output gate, the second character vector is a character vector that was input to the input and output gate immediately prior to inputting the first character vector, the output value of the second character vector is obtained by inputting the second character vector to the input and output gate, the feedback value of the second character is obtained by inputting the second character vector to the feedback gate;

obtaining an output value of the first character vector by performing a first logic operation on the first character vector, the output value of the second character vector, and the feedback value of the second character vector; and determining the feature vector corresponding to the sequence matrix based on the obtained output value of the at least one character vector, wherein obtaining the output value of the first character vector by performing the first logic operation on the first character vector, the output value of the second character vector, and the feedback value of the second character vector comprises:

obtaining a first weighted result by performing a first weighted calculation on the first character vector and the feedback value of the second character vector according to a first weight matrix;

obtaining a second weighted result by performing a second weighted calculation on the first character vector and the feedback value of the second character vector according to a second weight matrix;

obtaining a first operation result by inputting the first weighted result and a first offset parameter to a first tanh activation function;

obtaining a second operation result by inputting the second weighted result and a second offset parameter to a second tanh activation function; and obtaining an output value corresponding to the first character vector by multiplying the first operation result by the second operation result, and adding the multiplied result and the output value of the second character vector.

2. The method of claim 1, wherein determining a sequence matrix corresponding to the domain name comprises:

acquiring valid characters from the domain name, wherein the valid characters are composed of characters other than stored prefix characters and stored suffix characters in the domain name;

obtaining a first index sequence for the valid characters by determining an index value corresponding to each of the valid characters according to a stored mapping rule between characters and index values;

supplementing the first index sequence to obtain a second index sequence if the length of the first index sequence is smaller than a standard length, wherein the second index sequence has the standard length;

calculating a character vector corresponding to each index value in the second index sequence; and determining the sequence matrix based on the character vector corresponding to each index value in the second index sequence.

3. The method of claim 1, wherein
after obtaining the output value of the first character vector, the method further comprises:

obtaining a feedback value of the first character vector by performing a second logic operation on the output value of the first character vector, the first character vector, and the feedback value of the second character vector;

wherein the feedback value is used to calculate an output value of a character vector input to the input and output gate next time.

4. The method of claim 3, wherein obtaining a feedback value of the first character vector by performing a second logic operation on the output value of the first character vector, the first character vector, and the feedback value of the second character vector comprises:

obtaining a third weighted result by performing a third weighted calculation on the first character vector and the feedback value of the second character vector according to a third weight matrix;

obtaining a third operation result by inputting the third weighted result and a third offset parameter to a third tanh activation function;

obtaining a fourth operation result by inputting the output value of the first character vector to a fourth tanh activation function; and obtaining the feedback value of the first character vector by multiplying the third operation result by the fourth operation result.

5. The method of claim 4, further comprising:

acquiring a stored training sample set, wherein the training sample set comprises a plurality of positive samples and a plurality of negative samples; each of the positive samples is a sequence matrix corresponding to a legal domain name, and each of the negative samples is a sequence matrix corresponding to an illegal domain name;

obtaining an output value corresponding to each character vector comprised in each sequence matrix by sequentially inputting each character vector comprised in each sequence matrix to a first initial training model;

determining a feature vector corresponding to each sequence matrix based on the output value of each character vector in this sequence matrix;

obtaining a domain name identification result corresponding to each sequence matrix by inputting the feature vector corresponding to this sequence matrix to a second initial training model;

obtaining the domain name feature analysis model by adjusting the first weighted matrix, the second weighted matrix, the third weighted matrix, the first offset parameter, the second offset parameter and the third offset parameter comprised in the first initial training model by using the domain name identification result corresponding to each sequence matrix, through a back propagation algorithm; and obtaining the domain name classification model by adjusting the second initial training model by using the domain name identification result corresponding to each sequence matrix, through the back propagation algorithm.

6. A network device, which is provided with a domain name feature analysis model and a domain name classification model, the domain name feature analysis model comprising an input and output gate, the network device comprising a processor, a transceiver, and a machine readable storage medium storing machine executable instructions;

wherein, the transceiver is to receive a domain name resolution request sent by a terminal, and transmit the domain name resolution request to the processor, wherein the domain name resolution request comprises a domain name to be identified, and the domain name comprises at least one character;

the machine executable instructions are read and executed by the processor to cause the processor to:

determine a sequence matrix corresponding to the domain name, wherein the sequence matrix comprises at least one character vector, and each of the at least one character vector corresponds to each of the at least one character one to one;

sequentially input each of the at least one character vector to the input and output gate, wherein the input and output gate comprises a logic operation rule between a plurality of tanh activation functions;

obtain a feature vector corresponding to the sequence matrix by performing logical operation processing on each of the at least one character vector respectively based on the logical operation rule between the plurality of tanh activation functions; and determine whether the domain name is a legal domain name by inputting the feature vector corresponding to the sequence matrix to the domain name classification model;

when the domain name is determined as an illegal domain name, send no response message to the terminal, or send a prompt message to the terminal indicating that the domain name requested by the terminal is the illegal domain name;

when the domain name is determined as the legal domain name, send a response message carrying an IP address corresponding to the domain name to the terminal, so that the terminal accesses a terminal corresponding to this IP address, wherein the domain name feature analysis model further comprises a feedback gate, and the machine executable instructions cause the processor to:

acquire a first character vector, an output value of a second character vector, and a feedback value of the second character vector; wherein, the first character vector is a character vector that is currently input to the input and output gate, the second character vector is a character vector that was input to the input and output gate immediately prior to inputting the first character vector, the output value of the second character vector is obtained by inputting the second character vector to the input and output gate, the feedback value of the second character is obtained by inputting the second character vector to the feedback gate;

obtain an output value of the first character vector by performing a first logic operation on the first character vector, the output value of the second character vector, and the feedback value of the second character vector; and determine the feature vector corresponding to the sequence matrix through the obtained output value of the at least one character vector, wherein the machine executable instructions cause the processor to:

obtain a first weighted result by performing a first weighted calculation on the first character vector and the feedback value of the second character vector according to a first weight matrix;

obtain a second weighted result by performing a second weighted calculation on the first character vector and the feedback value of the second character vector according to a second weight matrix;

obtain a first operation result by inputting the first weighted result and a first offset parameter to a first tanh activation function;

obtain a second operation result by inputting the second weighted result and a second offset parameter to a second tanh activation function; and obtain an output value corresponding to the first character vector by multiplying the first operation result by the second operation result, and adding the multiplied result and the output value of the second character vector.

7. The network device of claim 6, wherein the machine executable instructions cause the processor to:

acquire valid characters from the domain name, wherein the valid characters are composed of characters other than stored prefix characters and stored suffix characters in the domain name;

obtain a first index sequence for the valid characters by determining an index value corresponding to each of the valid characters according to a stored mapping rule between characters and index values;

supplement the first index sequence to obtain a second index sequence if the length of the first index sequence is smaller than a standard length, wherein the second index sequence has the standard length;

calculate a character vector corresponding to each index value in the second index sequence; and determine the sequence matrix based on the character vector corresponding to each index value in the second index sequence.

8. The network device of claim 6, wherein the machine executable instructions further cause the processor to:

obtain a feedback value of the first character vector by performing a second logic operation on the output value of the first character vector, the first character vector, and the feedback value of the second character vector;

wherein the feedback value is used to calculate an output value of a character vector input to the input and output gate next time.

9. The network device of claim 8, wherein the machine executable instructions cause the processor to: obtain a third weighted result by performing a third weighted calculation on the first character vector and the feedback value of the second character vector according to a third weight matrix;

obtain a third operation result by inputting the third weighted result and a third offset parameter to a third tanh activation function;

obtain a fourth operation result by inputting the output value of the first character vector to a fourth tanh activation function; and obtain the feedback value of the first character vector by multiplying the third operation result by the fourth operation result.

10. The network device of claim 9, wherein the machine executable instructions further cause the processor to:

acquire a stored training sample set, wherein the training sample set comprises a plurality of positive samples and a plurality of negative samples; each of the positive samples is a sequence matrix corresponding to a legal domain name, and each of the negative samples is a sequence matrix corresponding an illegal domain name;

obtain an output value corresponding to each character vector comprised in each sequence matrix by sequentially inputting each character vector comprised in each sequence matrix to a first initial training model;

determine a feature vector corresponding to each sequence matrix based on the output value of each character vector in this sequence matrix;

obtain a domain name identification result corresponding to each sequence matrix by inputting the feature vector corresponding to this sequence matrix to a second initial training model;

obtain the domain name feature analysis model by adjusting the first weighted matrix, the second weighted matrix, the third weighted matrix, the first offset parameter, the second offset parameter and the third offset parameter comprised in the first initial training model by using the domain name identification result corresponding to each sequence matrix, through a back propagation algorithm; and obtain the domain name classification model by adjusting the second initial training model by using the domain name identification result corresponding to each sequence matrix, through the back propagation algorithm.

* * * * *